US012647486B2

(12) United States Patent     (10) Patent No.:   US 12,647,486 B2

Underwood et al.     (45) Date of Patent:     Jun. 2, 2026

(54) ENDPOINT STATE MANAGEMENT USING START PACKET SEQUENCE NUMBERS

(71) Applicant: Hewlett Packard Enterprise Development LP, Spring, TX (US)

(72) Inventors: Keith D. Underwood, Powell, TN (US); Robert L. Alverson, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 226 days.

(21) Appl. No.: 18/650,694

(22) Filed: Apr. 30, 2024

(65) Prior Publication Data

US 2025/0260743 A1     Aug. 14, 2025

Related U.S. Application Data

(60) Provisional application No. 63/553,240, filed on Feb. 14, 2024.

(51) Int. Cl.
| | |
|---|---|
| *H04L 67/142* | (2022.01) |
| *H04L 9/40* | (2022.01) |
| *H04L 47/34* | (2022.01) |

(52) U.S. Cl.
CPC ............ *H04L 67/142* (2013.01); *H04L 47/34* (2013.01); *H04L 63/123* (2013.01); *H04L 63/1441* (2013.01)

(58) Field of Classification Search
CPC ..... H04L 67/142; H04L 47/34; H04L 63/123; H04L 63/1441; H04L 63/0428; H04L 63/1466
See application file for complete search history.

(56) References Cited

U.S. PATENT DOCUMENTS

| | | | | |
|---|---|---|---|---|
| 6,044,402 | A * | 3/2000 | Jacobson | ............ H04L 63/1408 709/227 |
| 6,493,342 | B1 * | 12/2002 | Breslow | .................. H04L 47/15 370/474 |
| 11,336,683 | B2 * | 5/2022 | Gorrepati | ............ H04L 63/1416 |
| 11,405,324 | B1 * | 8/2022 | Segal | ........................ H04L 1/08 |
| 2009/0138611 | A1 * | 5/2009 | Miao | .................. H04L 61/2575 709/228 |
| 2019/0238585 | A1 * | 8/2019 | Millman | ............. H04L 63/1416 |
| 2022/0321667 | A1 * | 10/2022 | Ben-Shimon | ......... H04L 69/163 |
| 2023/0336981 | A1 * | 10/2023 | Huang | .................. H04W 12/04 |
| 2023/0388398 | A1 * | 11/2023 | Glynn | .................... H04L 69/22 |

(Continued)

*Primary Examiner* — Jerry B Dennison

(74) *Attorney, Agent, or Firm* — Yao Legal Services, Inc.

(57) ABSTRACT

A destination node receives a connection request packet which indicates a starting packet sequence number (PSN) associated with a source node. The destination node accepts a first connection corresponding to the connection request packet in response to the starting PSN being valid. In response to the source node closing the first connection, the destination node: sets an expected incoming PSN associated with the destination node to a greater of a current value of the expected incoming PSN and the starting PSN associated with the source node incremented by one; sends to the source node a close response message which includes the expected incoming PSN; and allows the source node to set the starting PSN to a greater of a current value of the starting PSN incremented by one and the expected incoming PSN associated with the destination node.

20 Claims, 9 Drawing Sheets

(56)        References Cited

U.S. PATENT DOCUMENTS

2025/0190246 A1*   6/2025   Wang .................. H04L 67/1097
2025/0193163 A1*   6/2025   Pismenny ............. H04L 63/164
2025/0260743 A1*   8/2025   Underwood .......... H04L 67/142
2025/0286926 A1*   9/2025   Yan .................... H04L 67/1097

* cited by examiner

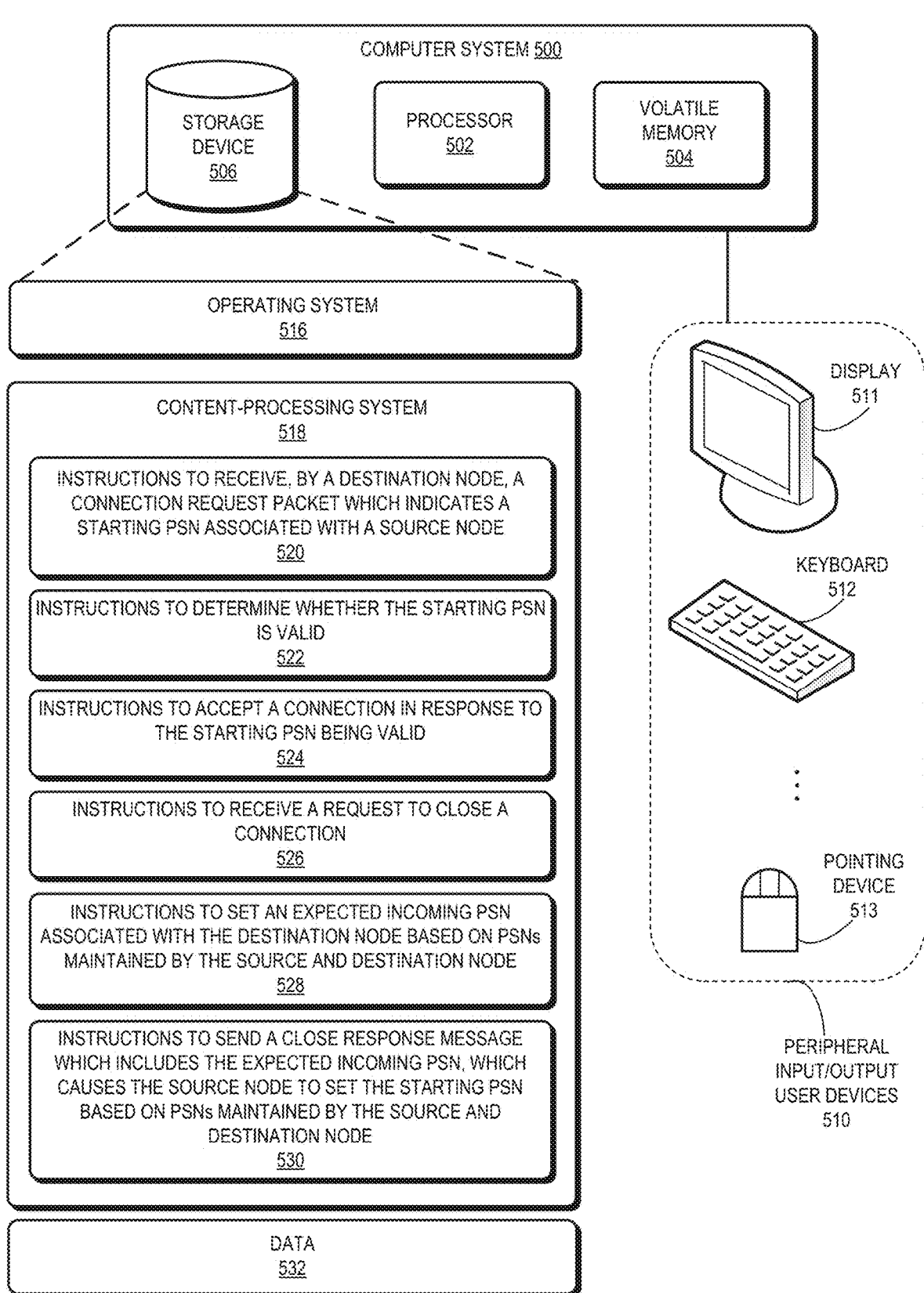

COMPUTER SYSTEM 500

STORAGE DEVICE 506

PROCESSOR 502

VOLATILE MEMORY 504

OPERATING SYSTEM 516

CONTENT-PROCESSING SYSTEM 518

INSTRUCTIONS TO RECEIVE, BY A DESTINATION NODE, A CONNECTION REQUEST PACKET WHICH INDICATES A STARTING PSN ASSOCIATED WITH A SOURCE NODE 520

INSTRUCTIONS TO DETERMINE WHETHER THE STARTING PSN IS VALID 522

INSTRUCTIONS TO ACCEPT A CONNECTION IN RESPONSE TO THE STARTING PSN BEING VALID 524

INSTRUCTIONS TO RECEIVE A REQUEST TO CLOSE A CONNECTION 526

INSTRUCTIONS TO SET AN EXPECTED INCOMING PSN ASSOCIATED WITH THE DESTINATION NODE BASED ON PSNs MAINTAINED BY THE SOURCE AND DESTINATION NODE 528

INSTRUCTIONS TO SEND A CLOSE RESPONSE MESSAGE WHICH INCLUDES THE EXPECTED INCOMING PSN, WHICH CAUSES THE SOURCE NODE TO SET THE STARTING PSN BASED ON PSNs MAINTAINED BY THE SOURCE AND DESTINATION NODE 530

DATA 532

DISPLAY 511

KEYBOARD 512

POINTING DEVICE 513

PERIPHERAL INPUT/OUTPUT USER DEVICES 510

FIG. 5

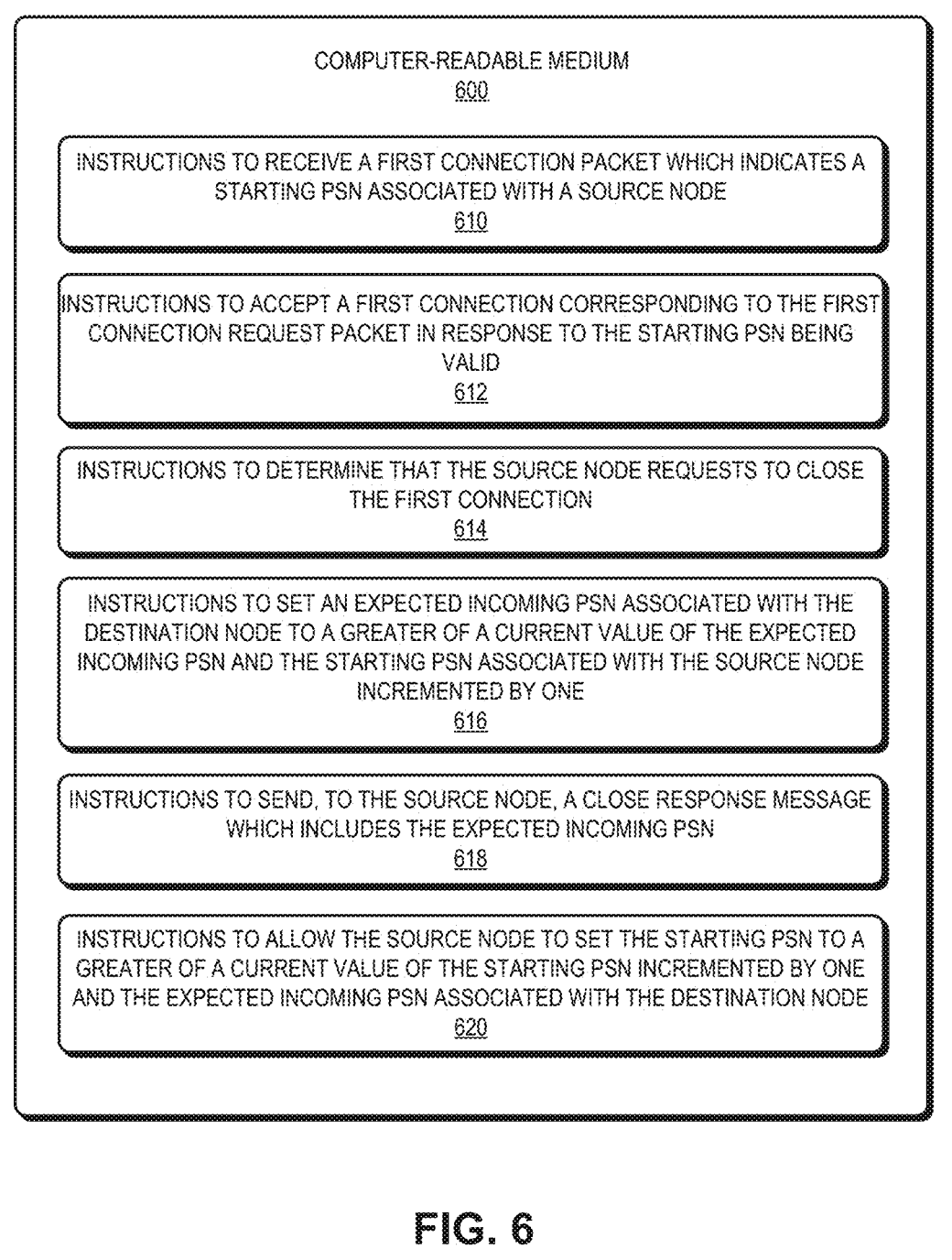

COMPUTER-READABLE MEDIUM
600

INSTRUCTIONS TO RECEIVE A FIRST CONNECTION PACKET WHICH INDICATES A STARTING PSN ASSOCIATED WITH A SOURCE NODE
610

INSTRUCTIONS TO ACCEPT A FIRST CONNECTION CORRESPONDING TO THE FIRST CONNECTION REQUEST PACKET IN RESPONSE TO THE STARTING PSN BEING VALID
612

INSTRUCTIONS TO DETERMINE THAT THE SOURCE NODE REQUESTS TO CLOSE THE FIRST CONNECTION
614

INSTRUCTIONS TO SET AN EXPECTED INCOMING PSN ASSOCIATED WITH THE DESTINATION NODE TO A GREATER OF A CURRENT VALUE OF THE EXPECTED INCOMING PSN AND THE STARTING PSN ASSOCIATED WITH THE SOURCE NODE INCREMENTED BY ONE
616

INSTRUCTIONS TO SEND, TO THE SOURCE NODE, A CLOSE RESPONSE MESSAGE WHICH INCLUDES THE EXPECTED INCOMING PSN
618

INSTRUCTIONS TO ALLOW THE SOURCE NODE TO SET THE STARTING PSN TO A GREATER OF A CURRENT VALUE OF THE STARTING PSN INCREMENTED BY ONE AND THE EXPECTED INCOMING PSN ASSOCIATED WITH THE DESTINATION NODE
620

FIG. 6

ENDPOINT STATE MANAGEMENT USING START PACKET SEQUENCE NUMBERS

RELATED APPLICATION

This application claims the benefit of U.S. Provisional Application No. 63/553,240, entitled "Managing Starting PSN to Achieve Anti-Replay Protection," by inventors Keith D. Underwood and Robert L. Alverson, filed 14 Feb. 2024.

BRIEF DESCRIPTION OF THE FIGURES

FIG. 5 illustrates a computer system which facilitates endpoint state management using start PSNs, in accordance with an aspect of the present application.

FIG. 6 illustrates a computer-readable medium which facilitates endpoint state management using start PSNs, in accordance with an aspect of the present application.

In the figures, like reference numerals refer to the same figure elements.

DETAILED DESCRIPTION

Figure 1:
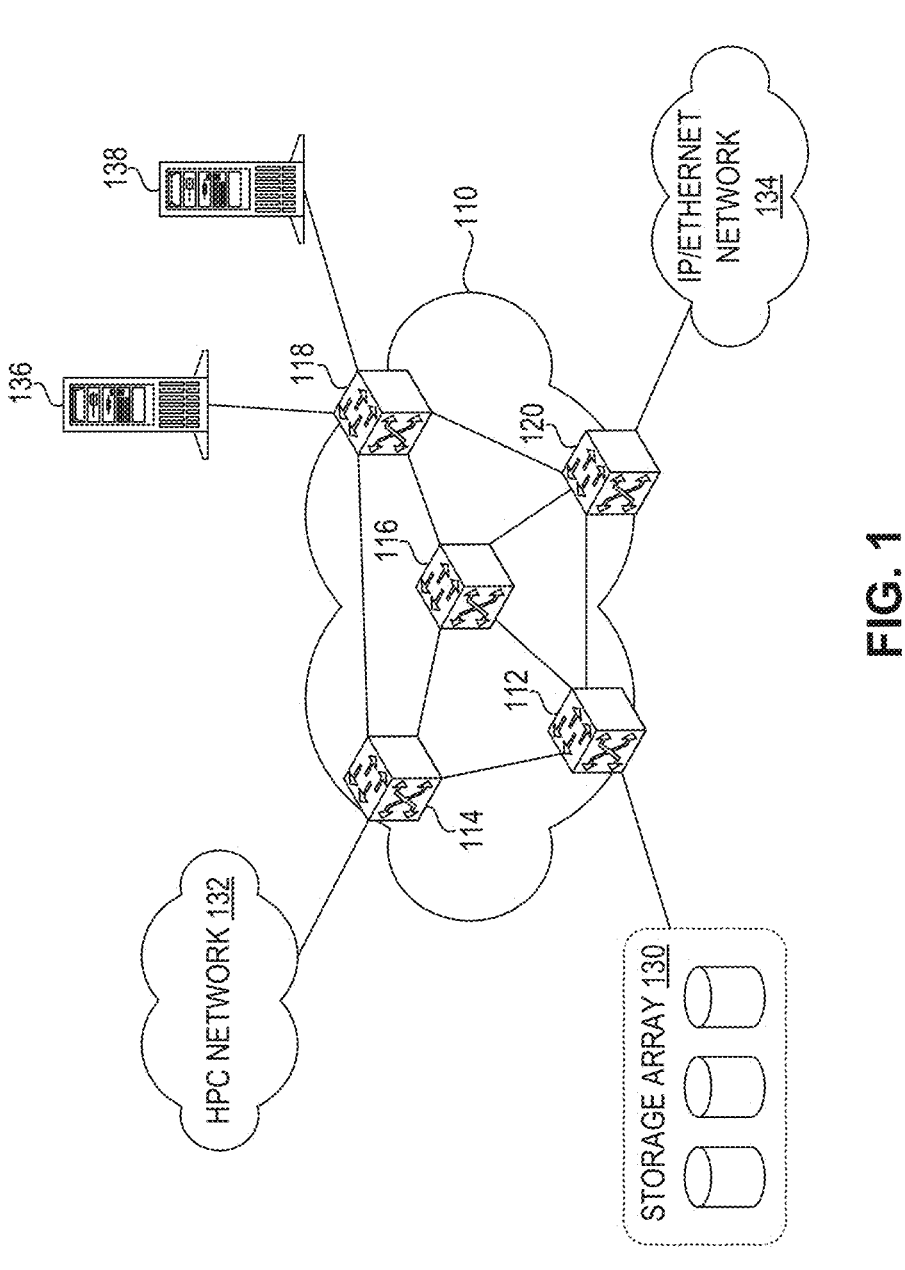
FIG. 1 illustrates an environment which facilitates endpoint state management using start packet sequence numbers (PSNs), in accordance with an aspect of the present application.

Aspects of the present application can protect nodes in a distributed system against replay attacks by managing "packet sequence numbers" (PSNs) and reducing the cost associated with tracking the next starting PSN for every peer node. In the described aspects, each node can maintain two fields for a commonly installed key: a "starting PSN" (or "startPSN") which is to be used upon a node opening a connection; and an "expected incoming PSN" (or "eiPSN") which is to be used by the node when determining whether to accept a connection request.

Anti-replay protection refers to preventing a network attack in which valid data transmission between a source and a destination (i.e., a pair of endpoints) is maliciously or fraudulently repeated or delayed, e.g., preventing an attacker from capturing data which was known to be valid in the past and using that captured data again. Packet sequence numbers (PSNs) may be used to prevent replay attacks for established connections, e.g., in a path between a pair of endpoints or nodes. PSNs may be encrypted, which can make it difficult for an attacker to know when to replay a packet. If the path has been idle for a long period of time, the attacker can infer that the connection is likely down and capture the start packet of a next message. In order to prevent this, the starting PSN for a connection should not be reused for a key between a given pair of endpoints. While the same PSN can be used as a non-starting PSN during one connection and as a starting PSN for another connection, a significant cost may be associated with tracking the next starting PSN for every peer node in a distributed system with a large number of nodes.

The described aspects of the present application can address the cost associated with tracking starting PSNs for every peer node by providing endpoint state management based on enforcing monotonically increasing starting PSNs, which can be maintained and updated by each node or endpoint while opening and closing connections between the nodes. This can result in protecting the nodes or endpoints from replay attacks.

During an initiation or installation process for a key to be used for secure communication, participating nodes in a distributed system can each set two fields for the key. The first field can be the "starting PSN" ("startPSN") to use with the key, and the second field can be the "expected incoming starting PSN" ("eiPSN") for the key. The initial values can be set to any value, e.g., 0, which is the same across all users of the key. Each node can track the values of these two fields (startPSN and eiPSN) and increment or change the values based on connections opening and closing.

For example, given a pair endpoints (e.g., a source node A and destination node B), node A can open a connection with node B, based on the key and A's starting PSN. If A's starting PSN is valid (i.e., if A's starting PSN is greater than or equal to B's expected incoming starting PSN), node B can accept the connection using A's starting PSN. Subsequently, node A can close the connection with node B. Node B can set B's expected incoming starting PSN to the greater of B's current expected incoming starting PSN and A's starting PSN incremented by one. Node B can also send a close response to node A, including B's expected incoming starting PSN, which can result in node A then setting A's starting PSN to the greater of A's own current starting PSN incremented by one and B's expected incoming starting PSN. By incrementing the expected starting PSN by 1 only upon a connection closing, the system can minimize the rate at which the expected incoming PSN increases. The higher the rate at which the expected incoming PSN increases, the more likely the chance of a "round-trip failure," in which the source node attempts to open a connection using a start PSN which is less than the expected incoming PSN maintained by the destination node, and the destination node must send a rejection message with a correct or valid PSN to use. Round-trip failures can result in unnecessary traffic in the system, as described below in relation to FIGS. 2A-C.

Thus, in the described aspects, each node can manage its own expected incoming PSN to be greater than the largest starting PSN used to start a connection with the node, which connection has been closed. Each node can also maintain its own starting PSN to be greater than or ahead of what other nodes may expect, i.e., by dynamically increasing a node's own starting PSN based on feedback from its peer nodes so that the node's own starting PSN is always greater than what a peer has informed the node to use.

The terms "starting PSN," "start PSN," and "startPSN" are used interchangeably in this disclosure and refer to a value of a packet sequence number to be used when a node starts a connection. The startPSN can be monotonically increased based upon receiving a "close response" message (e.g., in response to the node sending a request to close the connection). The notation "X.startPSN" refers to the startPSN associated with and tracked by a node X.

The terms "expected incoming PSN" and "eiPSN" are used interchangeably in this disclosure and refer to a packet sequence number which a node expects to receive when a connection request is sent to the node. The eiPSN can be increased upon receiving a request to close a connection with another node and can be based upon the startPSN used to open that connection. The notation "X.eiPSN" refers to the eiPSN associated with and tracked by a node X.

The terms "node" and "endpoint" are used interchangeably in this disclosure and refer to a device, component, or hardware component which can operate as a source or a destination of data, including e.g., a control packet, a connection request packet (including to open or close a connection), and a data packet.

The term "distributed system" can refer to a system in which each of a plurality of nodes can communicate with one or more or the other nodes, including communications to open or close connections and transmit data between a pair of nodes or endpoints.

FIG. 1 illustrates a diagram 100 of an exemplary network architecture, in accordance with an aspect of the present application. Diagram 100 can include a network 110 of switches which can be referred to as a "switch fabric" and can include switches 112, 114, 116, 118, and 120. Each switch can have a unique address or identifier within switch fabric 110. Various types of devices and networks can be coupled to a switch fabric. For example, a storage array 130 can be coupled to switch fabric 110 via switch 112; a high performance computing (HPC) network (e.g., InfiniBand, Slingshot, or any other high performance network) 132 can be coupled to switch fabric 110 via switch 114; a number of end hosts, such as hosts 136 and 138, can be coupled to switch fabric 110 via switch 118; and an Internet Protocol (IP)/Ethernet network 134 can be coupled to switch fabric 110 via switch 120. An HPC network can include multiple networked computer and storage devices concurrently running programs to complete different complex and performance-intensive tasks. An IP/Ethernet network can include physical Ethernet cabling and an application layer protocol between network devices based on IP, including communication via Transport Communication Protocol (TCP)/IP and User Datagram Protocol (UDP) packets. In general, a switch can have edge ports and fabric ports. An edge port can couple to a device that is external to the fabric. A fabric port can couple to another switch within the fabric via a fabric link. Typically, traffic can be injected into switch fabric 110 via an ingress port of an edge switch and can leave switch fabric 110 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Figure 2A:
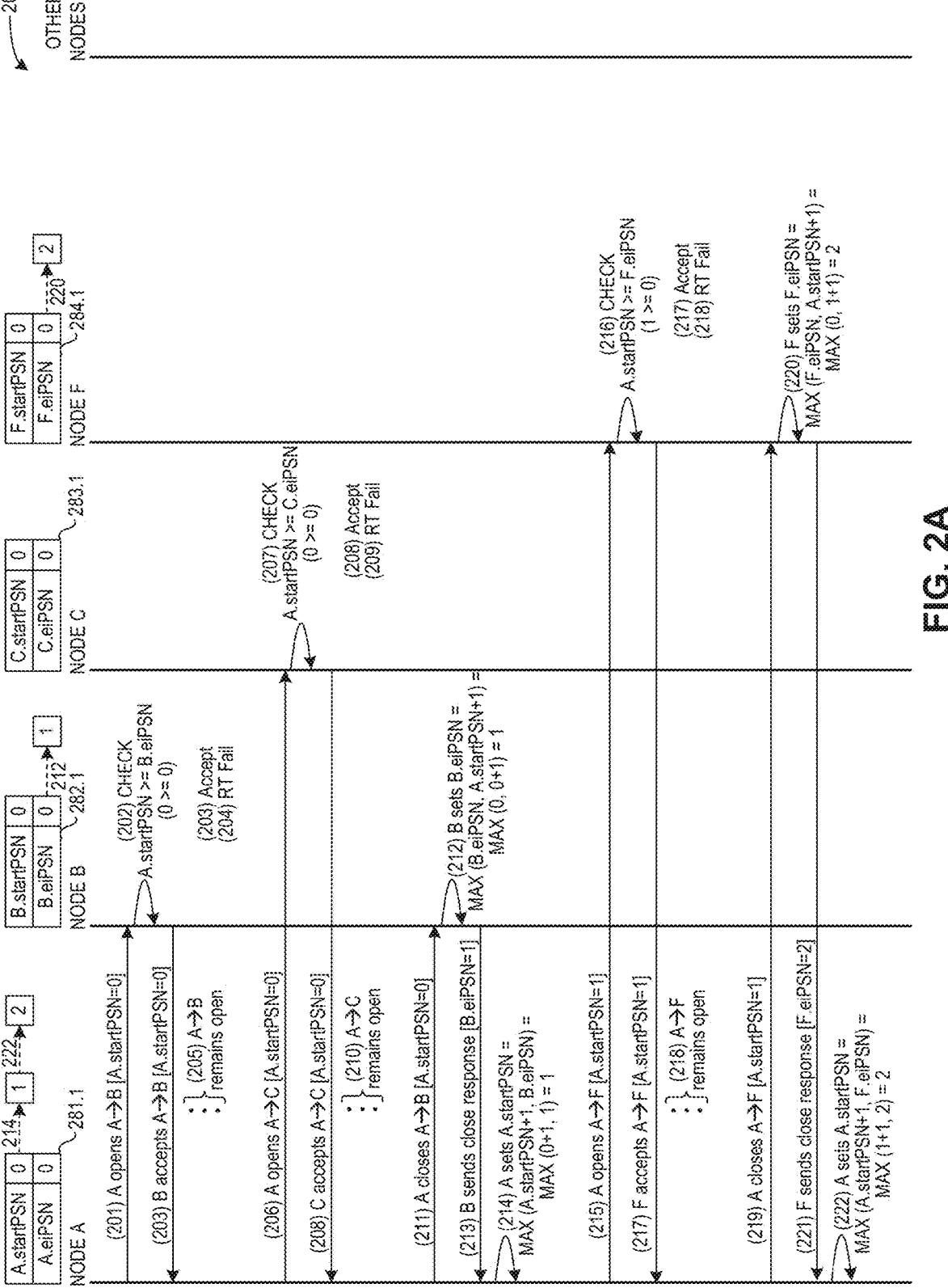
FIG. 2A illustrates a diagram of communications and tables which facilitate endpoint state management using PSNs, in accordance with an aspect of the present application.

FIG. 2A illustrates a diagram 200 of communications and tables which facilitate endpoint state management using PSNs, in accordance with an aspect of the present application. Diagram 200 depicts communications between a plurality of nodes, including nodes A-F and other nodes G, which can participate in a distributed system. During a key initiation or installation process, each participating node can set two fields for the key: a "starting PSN" ("startPSN"); and an "expected incoming starting PSN" ("eiPSN"). The initial values for all participating nodes (e.g., users which have installed the same key) must be the same and can be set to any value, e.g., 0. Each node can track the values of these two fields (startPSN and eiPSN) and increment or change the values based on connections opening and closing. For example: node A can maintain two fields 281.1, with "A.startPSN" and "A.eiPSN" initialized to a value of "0"; node B can maintain two fields 282.1, with "B.startPSN" and "B.eiPSN" initialized to a value of "O"; node C can maintain two fields 283.1, with "C.startPSN" and "C.eiPSN" initialized to a value of "0"; node F can maintain two fields 284.1, with "F.startPSN" and "F.eiPSN" initialized to a value of "0"; and other nodes G can also each maintain two fields (not shown) initialized to a value of "0." Updates to the two fields can be indicated by the dashed arrows between values for each of the maintained fields.

During operation, node A can open a connection with node B by sending a connection request packet which indicates the startPSN ("0") of node A (201). Node B can determine whether the startPSN is valid, by performing a check of whether the startPSN of node A is greater than or equal to the eiPSN of node B (202). If it is, this indicates the startPSN of node A is valid (203). If it is not, this indicates that the start PSN of node A is not valid (204), resulting in a "round-trip fail." A round-trip fail is described below in relation to communications 240-243 of FIG. 2B. In this case, check 202 indicates that 0 is greater than or equal to 0, which results in node B accepting the connection with the startPSN ("0") of node A (203). The connection from node A to node B can remain open for a period of time (205).

Subsequently, node A can open a connection with node C by sending a connection request packet which indicates the startPSN ("0") of node A (206). Node C can determine whether the startPSN is valid, by performing a check of whether the startPSN of node A is greater than or equal to the eiPSN of node B (207). If it is, this indicates the startPSN of node A is valid (208). If it is not, this indicates that the start PSN of node A is not valid (209) (i.e., a round-trip fail). In this case, check 207 indicates that 0 is greater than or equal to 0, which results in node C accepting the connection with the startPSN ("0") of A (208). The connection from node A to node C can remain open for a period of time (210).

Node A can determine to close the connection to node B (which was opened with a startPSN of "0") by sending a close request to node B (211). Upon receiving the close request, node B can set its eiPSN to a greater of a current value of its eiPSN and the startPSN (of node A used to open the connection) incremented by one: MAX (B.eiPSN, A.startPSN+1)=MAX (0, 0+1)=1 (212, and as indicated in the update of B.eiPSN in fields 282.1 from a value of "0" to a value of "1"). Node B can send to node A a close response message which includes the B.eiPSN ("1") (213). Upon receiving the close response message, node A can set its startPSN to a greater of a current value of its start PSN incremented by one and the eiPSN of node B: MAX (A.startPSN+1, B.eiPSN)=MAX (0+1, 1)=1 (214, and as indicated in the update of A.startPSN in fields 281.1 from a value of "0" to a value of "1").

Next, node A can open a connection with node F by sending a connection request packet which indicates the startPSN ("1") of node A (215). Node F can determine whether the startPSN is valid, by performing a check of whether the startPSN of node A is greater than or equal to the eiPSN of node F (216). If it is, this indicates the startPSN of node A is valid (217). If it is not, this indicates that the start PSN of node A is not valid (218) (i.e., a round-trip fail). In this case, check 216 indicates that 1 is greater than or equal to 0, which results in node F accepting the connection with the startPSN ("1") of node A (217). The connection from node A to node F can remain open for a period of time (218).

Node A can then determine to close the connection to node F (which was opened with a startPSN of "1") by sending a close request to node F (219). Upon receiving the close request, node F can set its eiPSN to a greater of a current value of its eiPSN and the startPSN (of node A used to open the connection) incremented by one: MAX (F.eiPSN, A.startPSN+1)=MAX (0, 1+1)=2 (220, and as indicated in the update of F.eiPSN in fields 284.1 from a value of "0" to a value of "2"). Node F can send to node A a close response message which includes the F.eiPSN ("2") (221). Upon receiving the close response message, node A can set its startPSN to a greater of a current value of its start PSN incremented by one and the eiPSN of node F: MAX (A.startPSN+1, F.eiPSN)=MAX (1+1, 2)=2 (222, and as indicated in the update of A.startPSN in fields 281.1 from a value of "1" to a value of "2").

Figure 2B:
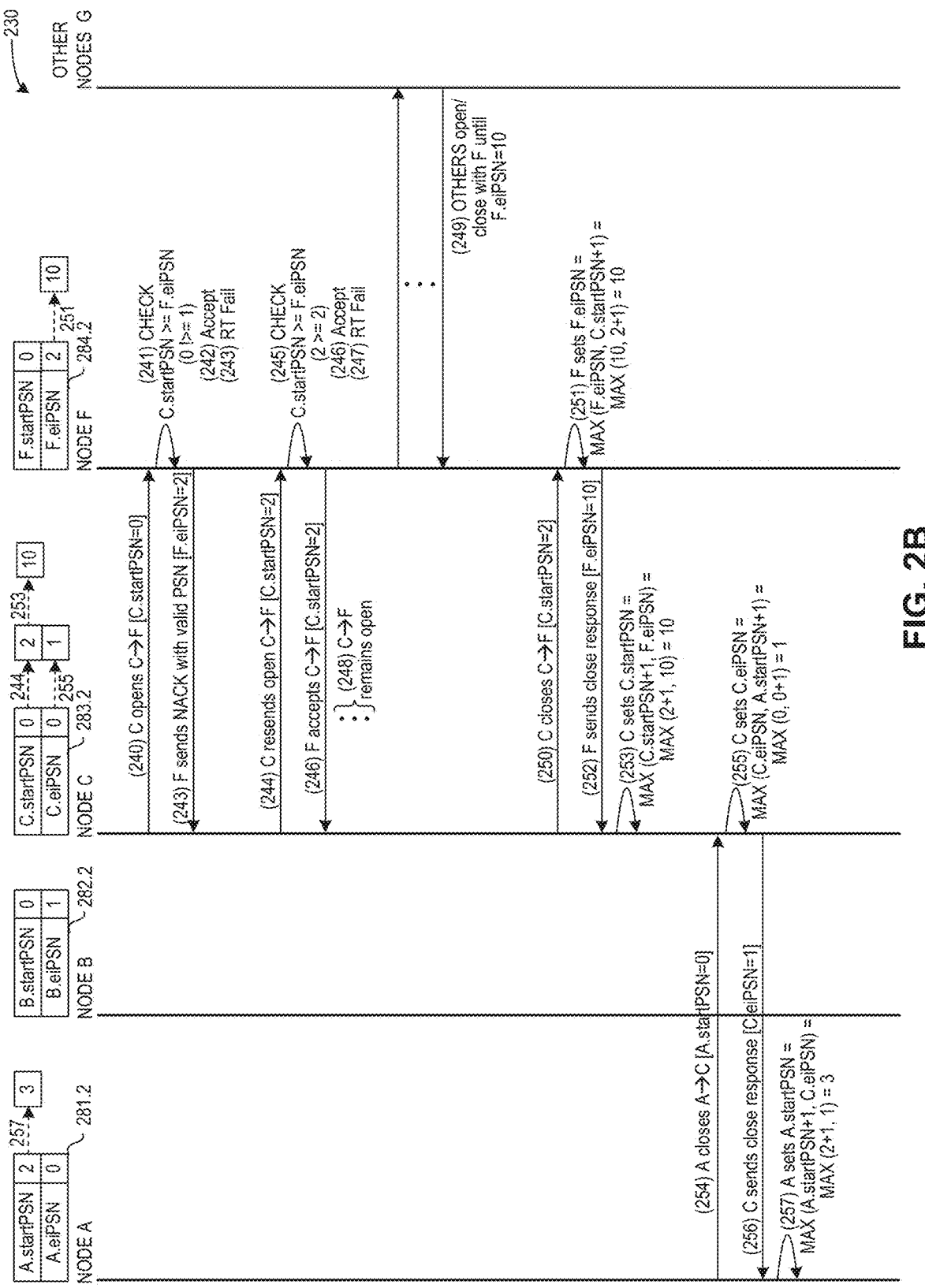
FIG. 2B illustrates a diagram of communications and tables which facilitate endpoint state management using start PSNs, in accordance with an aspect of the present application.

FIG. 2B illustrates a diagram 230 of communications and tables which facilitate endpoint state management using start PSNs, in accordance with an aspect of the present application. The communications in diagram 230 can occur subsequent to the communications in diagram 200. The starting values of fields 281.2, 282.2, 283.2, and 284.2 reflect the most current starting values of corresponding fields 281.1, 282.1, 283.1, and 284.1 at the end of the communications in diagram 200.

Node C can open a connection with node F by sending a connection request packet which indicates the startPSN ("0") of node C (240). Node F can determine whether the startPSN is valid, by performing a check of whether the startPSN of node C is greater than or equal to the eiPSN of node F (241). If it is, this indicates the startPSN of node C is valid (242). If it is not, this indicates that the start PSN of node C is not valid (243) (i.e., a round-trip fail). In this case, check 241 indicates that 0 is not greater than or equal to 1, which results in node F sending to node C a negative acknowledgment (NACK) packet with a valid PSN (243). The valid PSN can be the current value of the eiPSN of node F or a largest starting PSN across all open connections on node F. Determining which value to use as the valid PSN is described below in relation to operation 277 of FIG. 2C. In this case, F sends its current eiPSN ("2"). Communications 240-243 indicate a round-trip fail, which can decrease the efficiency of the overall system.

Upon receiving the valid PSN from node F, node C can set its C.startPSN to the received valid F.eiPSN ("2"), as long as its current value of C.startPSN is not less than or equal to the received valid F.eiPSN. For example, if between the time node C sends communication 240 and the time node C receives communication 243, node C had updated its C.startPSN to a current value greater than 2 (e.g., "3"), then node C would not set its C.startPSN to the received valid F.eiPSN ("2") and would instead keep that current value ("3") as its C.startPSN. Node C can subsequently resend the connection request packet (i.e., send a new connection request packet) which indicates the current startPSN of node C (244). In the depicted example, the current value of C.startPSN has been updated to "2" in response to receiving the NACK (244, and as indicated in the update of C.startPSN in fields 283.2 from a value of "2" to a value of "10"), so the connection request packet is sent with a startPSN of "2" (244). Node F can determine whether the startPSN is valid, by performing a check of whether the startPSN of node C is greater than or equal to the eiPSN of node F (245). If it is, this indicates the startPSN of node C is valid (246). If it is not, this indicates that the start PSN of node C is not valid (247) (i.e., a round-trip fail). In this case, check 241 indicates that 2 is greater than or equal to 2, which results in node F accepting the connection with the startPSN ("2") of C (246). The connection from node C to node F can remain open for a period of time (248).

In some aspects, node C or node F may track that the new connection request packet (244) is a resend of a previously sent connection request packet (240), i.e., part of a round-trip fail, and use that information when determining which eiPSN to use (as described below in relation to check 277 of FIG. 2C).

Subsequently, other nodes G can open and close connections with node F until the eiPSN of node F has been incremented to a value of, e.g., "10" (249).

Node C can determine to close the connection to node F (which was opened with a startPSN of "2") by sending a close request to node F (250). Upon receiving the close request, node F can set its eiPSN to a greater of a current value of its eiPSN and the startPSN (of node C used to open the connection) incremented by one: MAX (F.eiPSN, C.startPSN+1)=MAX (10, 2+1)=10 (251, and as indicated in the update of F.eiPSN in fields 284.2 from a value of "2" to a value of "10"). Node F can send to node C a close response message which includes the F.eiPSN ("2") (252). Upon receiving the close response message, node C can set its startPSN to a greater of a current value of its start PSN incremented by one and the eiPSN of node F: MAX (C.startPSN+1, F.eiPSN)=MAX (2+1, 10)=10 (253, and as indicated in the update of C.startPSN in fields 283.2 from a value of "2" to a value of "10").

Next, node A can determine to close the connection to node C (which was opened with a startPSN of "0" in 206 of FIG. 2A) by sending a close request to node C (254). Upon receiving the close request, node C can set its eiPSN to a greater of a current value of its eiPSN and the startPSN (of node A used to open the connection) incremented by one: MAX (C.eiPSN, A.startPSN+1)=MAX (0, 0+1)=1 (255, and as indicated in the update of C.eiPSN in fields 283.2 from a value of "0" to a value of "1"). Node C can send to node A a close response message which includes the C.eiPSN ("1") (252). Upon receiving the close response message, node A can set its startPSN to a greater of a current value of its start PSN incremented by one and the eiPSN of node C: MAX (A.startPSN+1, C.eiPSN)=MAX (2+1, 1)=3 (257, and as indicated in the update of A.startPSN in fields 281.2 from a value of "2" to a value of "3"). Alternatively, because the start PSN of "2" has never been used before in starting a connection from node A to node C, the system does not need to increment A.startPSN by 1. That is, node A does not need to increment its start PSN when C sends the close response and instead, node A can leave its start PSN at a value of "2."

Figure 2C:
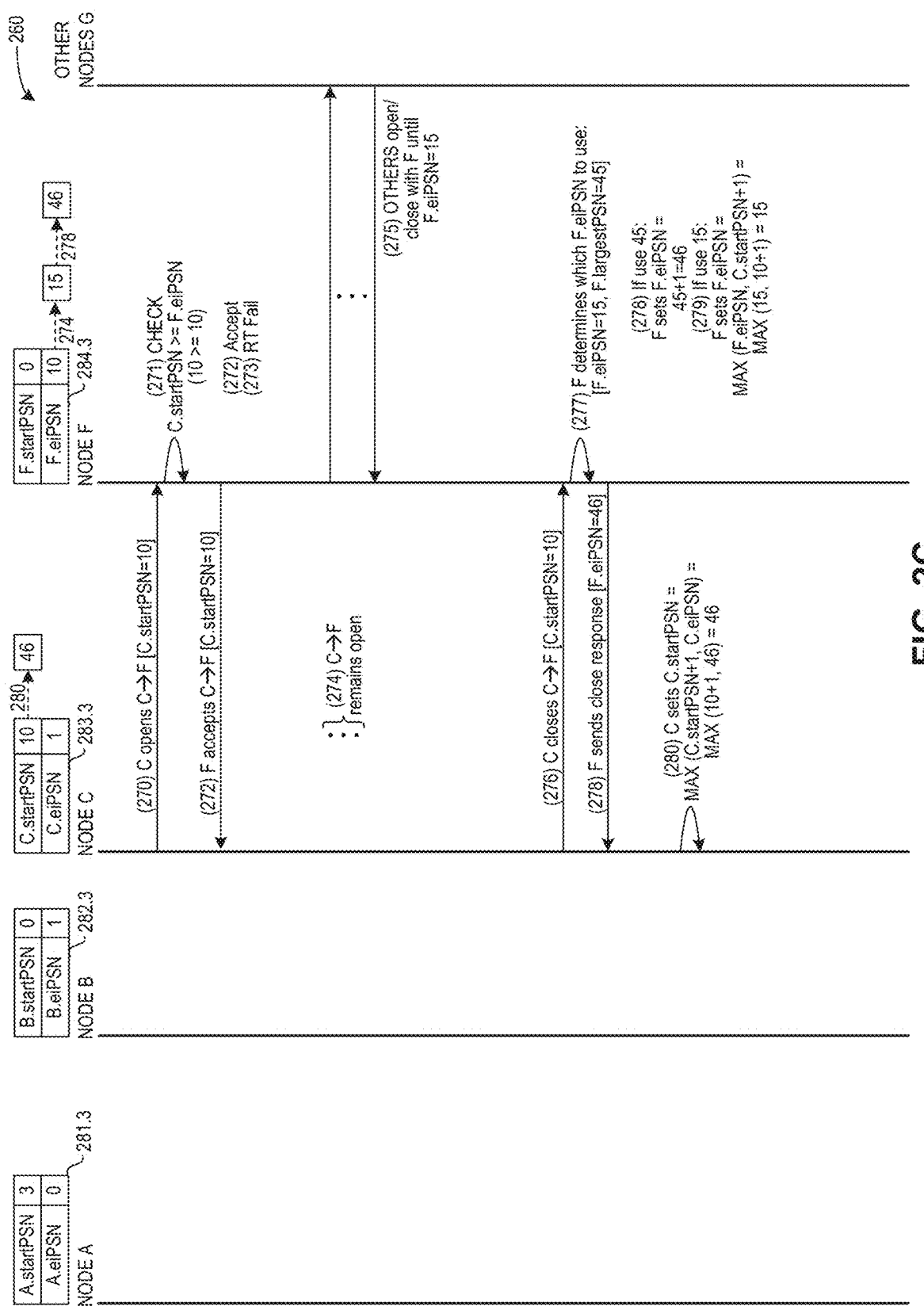
FIG. 2C illustrates a diagram of communications and tables which facilitate endpoint state management using start PSNs, in accordance with an aspect of the present application.

FIG. 2C illustrates a diagram 260 of communications and tables which facilitate endpoint state management using start PSNs, in accordance with an aspect of the present application. The communications in diagram 260 can occur subsequent to the communications in diagram 230. The starting values of fields 281.3, 282.3, 283.3, and 284.3 reflect the most current starting values of corresponding fields 281.2, 282.2, 283.2, and 284.2 at the end of the communications in diagram 230.

Node C can open a connection with node F by sending a connection request packet which indicates the startPSN ("10") of node C (270). Node F can determine whether the startPSN is valid, by performing a check of whether the startPSN of node C is greater than or equal to the eiPSN of node F (271). If it is, this indicates the startPSN of node C is valid (272). If it is not, this indicates that the start PSN of node C is not valid (273) (i.e., a round-trip fail). In this case, check 271 indicates that 10 is greater than or equal to 10, which results in node F accepting the connection with the startPSN ("10") of C (272). The connection from node C to node F can remain open for a period of time (274).

Subsequently, other nodes G can open and close connections with node F until the eiPSN of node F has been incremented to a value of, e.g., "15" (275).

Node C can determine to close the connection to node F (which was opened with a startPSN of "10") by sending a close request to node F (276). Upon receiving the close request, node F can determine whether to use its current eiPSN ("15") or, if node F determines that the largest PSN that it has seen across all of the open connections to node F is greater than the current eiPSN, to use that largest PSN (e.g., "45") (277). For example, one of other nodes G may have opened a connection (not shown) with node F using a start PSN of 45 but not yet closed the connection with F, i.e., not yet triggering an update of F.eiPSN to 45. Node F can make the determination on whether to use its current eiPSN or the largest PSN based on heuristics or conditions including, e.g., information gathered as part of increasing its own eiPSN by closing connections with other nodes, a predetermined maximum threshold of a difference between its current eiPSN and the largest PSN across all open connections on node F, a number of previously occurring round-trip fails with the same initiating node, and one or more preconfigured conditions.

If node F determines to use the largest PSN ("45") based on the heuristics or conditions and since the largest PSN ("45") is greater than its current eiPSN ("15"), node F can send a close response message with F.eiPSN equal to the largest PSN incremented by 1: F.eiPSN=(45+1=46). Although node F can send to node C this value ("46") which is based on the largest PSN, node F may not set its F.eiSPN to this value ("46"). Instead, node F can expect that it may likely set its F.eiSPN to that largest PSN at some time in the future. The described aspects can provide a more effective use of the PSNs by ensuring that nodes do not spontaneously increase their own eiPSN, as other nodes may not yet have updated their own startPSNs. Thus, node C can subsequently open a connection with node F using "46" even though node F may only be expecting "15." Alternatively, in some aspects, node F can set its eiPSN to the largest PSN incremented by one: F.eiPSN-(45+1=46) (278, and as indicated in the update of F.eiPSN in fields 284.3 from a value of "15" to a value of "46"). Node F may determine to set is eiPSN to "46" based on one or more conditions, e.g., a triggering condition when the difference between the largest startPSN and the current iePSN is less than a certain predetermined threshold. Node F can send a close response with its current F.eiPSN ("46") (278). Upon receiving the close response message, node C can set its startPSN to a greater of a current value of its start PSN incremented by one and the eiPSN of node F: MAX (C.startPSN+1, F.eiPSN) =MAX (10+1, 46)=46 (280, and as indicated in the update of C.startPSN in fields 283.3 from a value of "10" to a value of "46"). If node F determines to use the current value of its eiPSN ("15") (279), then node F can send a close response with the current eiPSN value (278), and node C can set its startPSN based on that eiPSN (not depicted).

The total space of PSNs can be based on the chosen size for the PSN, e.g., 32 bits. When the startPSN reaches its limit and needs to wrap, the system can perform a rekey operation prior to when the startPSN would need to wrap, e.g., based on a predetermined maximum threshold of the total PSN space or another configurable condition.

In addition, the system can segment, for a given encryption key, the total PSN space into a number of segments or starting PSN spaces. In one aspect, the source node can segment the startPSN and the destination node can segment the eiPSN. In another aspect, the target alone can retain control of managing the eiPSN and ensuring the correctness of the eiPSN by segmenting the eiPSN, which can limit the cross-pollination between source nodes that may be induced by the destination node. In using segmented PSN spaces, the system need only guarantee that a given pair of nodes (i.e., source node and destination node) never uses the same startPSN more than once. This segmentation can result in isolating the impact of one segmented group from another segmented group and can further result in decreasing the impact of a rapidly increasing eiPSN due to other destination nodes of a given destination node with which a source node is currently communicating.

In determining the segmented space and using the proper startPSN and eiPSN in a given segmented space, a pair of nodes can use the same or different hash functions with each other, but to ensure consistency at each node, each node must use the same hash function for itself. That is, nodes may use different hash functions between each other, but each node must use the same hash function to maintain consistency within the specific node. The hash functions can be performed based on one or more fields associated with the source node (in the case of determining the current value of the eiPSN of the destination node) or with the destination node (in the case of determine the starting PSN associated with the source node. The fields can include, e.g., an IP address of the source or destination node and an identifier of the connection based on the source or destination node.

Certain circumstances may result in a multiple round-trip fails. For example, a destination node B may experience heavy activity, e.g., many opens/closes, which can result in a rapid increase in the eiPSN and multiple round-trip fails when a source node A attempts to open a connection using its current (and not yet updated) startPSN. In such a case, the destination node may determine to use a different eiPSN. For example, node A can attempt to open a connection with node B by sending a connection request packet which indicates that A.startPSN=80. Node B can determine whether A.startPSN is valid, by performing a check of whether A.startPSN is greater than or equal to B.eiPSN. Assuming that it is not (e.g., that the current B.eiPSN=120), this indicates that A.startPSN is not valid (i.e., a round-trip fail). As described above for check 277, node B can determine to send either its current eiPSN ("120") or the largest starting PSN it has seen over all its connections incremented by one (e.g., 199+1=200). Node B can also track which eiPSN (e.g., current or largest) and the corresponding value (e.g., "120" or "200") that node B sent back to node A as a result of the round-trip fail. In response to receiving a subsequent connection request packet from A, if another round-trip fail occurs, node B can send back to node A the tracked and previously sent eiPSN incremented by one (e.g., "201"). While this function may require that the nodes maintain a certain amount of state, the system can achieve a reduced rate of increase in the expecting incoming PSN by tracking the most recently sent eiPSN on a connection open or a round-trip fail.

In another aspect of the present application which addresses multiple round-trip fails, the source node can determine to use a different startPSN. For example, node A may attempt to open a connection with node B using A.startPSN=80. Node B may respond with a NACK which indicates B.eiPSN=200. Node A may attempt to again open the connection with node B using A.startPSN=200. However, B.eiPSN may have increased during this time, and node B may respond with a NACK which indicates B.eiPSN=210. At this point, instead of using A.startPSN=210 in the next connection request packet, node A can determine a "safe guess" for its startPSN by preemptively increasing its startPSN based on, e.g., one or more of: a number of round-trip fails; a difference between the eiPSN received as a result of the first round-trip fail (e.g., "200") and the eiPSN received as a result of the second round-trip fail ("210"); a scaled number based on the difference; and any other heuristic or condition based on information tracked, maintained, or analyzed by the nodes. For example, node A can determine a safe guess of A.startPSN=220, which is based on a difference ("10") between the eiPSNs received in the first round-trip fail and the second round-trip fail (220−210=10).

Thus, to address multiple round-trip fails, both the source node and the destination node can make decisions regarding which eiPSN or startPSN to use in the event of a round-trip fail, and those decisions can be based on the factors as listed above.

Figure 3:
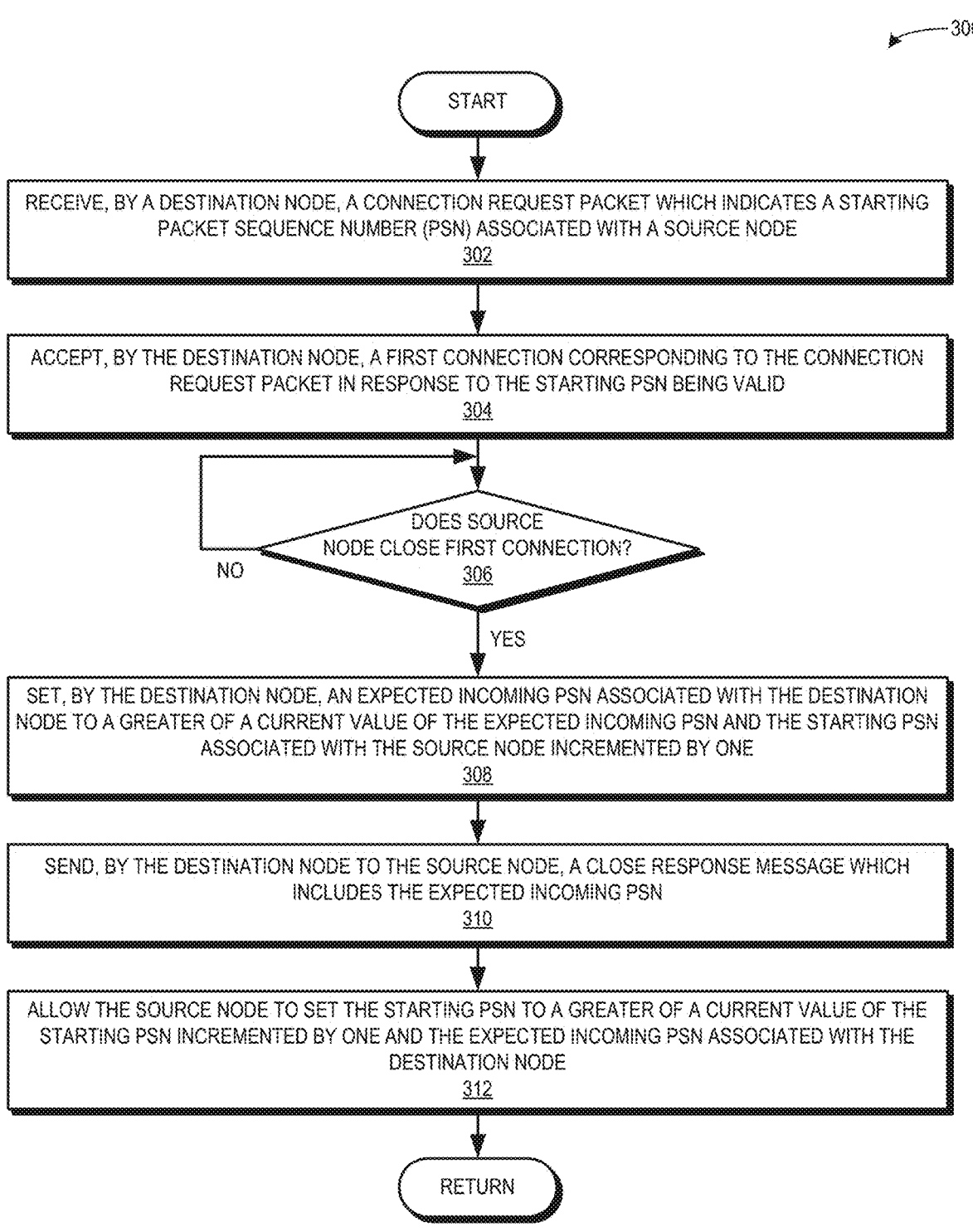
FIG. 3 presents a flowchart illustrating a method which facilitates endpoint state management using start PSNs, in accordance with an aspect of the present application.

FIG. 3 presents a flowchart 300 illustrating a method which facilitates endpoint state management using start PSNs, in accordance with an aspect of the present application. During operation, the system receives, by a destination node, a connection request packet which indicates a starting packet sequence number (PSN) associated with a source node (operation 302). For example, node A (source node) opens a connection with node B (destination node), and node B (destination node) receives a connection request packet with the startPSN of A equal to a value of "0" (as described above in relation to communication 201 of FIG. 2A). Each participating node can maintain two fields (startPSN and eiPSN), which are set to the same values when each node initializes or installs a key to be used for communications between the nodes. The starting value can be, e.g., 0. In some aspects, the starting value can be initialized by segmenting an encryption key into a number of different starting PSN values. The source and destination nodes of each pair of source/destination nodes can hash one or more fields of the connection request packet or other control packet to determine a starting PSN space. The one of more fields can include, e.g., but are not limited to, at least one of: an IP address of the source node; an IP address of the destination node; an identifier of a connection based on the source node; an identifier of the connection based on the destination node.

The system can accept, by the destination node, a first connection corresponding to the connection request packet in response to the starting PSN being valid (operation 304). The destination node can determine whether the starting PSN is valid by comparing the startPSN associated with the source node and the eiPSN associated with the destination node. If the starting PSN is greater than or equal to the eiPSN of the destination node, the starting PSN is valid. For example, in FIG. 2A, node B can receive the connection request packet from node A (201) and perform a check (202) to determine whether A.startPSN>=B.eiPSN. Since this is true (because 0>=0), node B can accept the connection (203).

If the source node does not close the first connection (decision 306), the operation continues until the source node closes the first connection. While the first connection remains open, other nodes may open and close connections with the destination node, which can increase the value of the expected incoming PSN associated with the destination node, as described above in relation to operations 274 and 275 of FIG. 2C. If the source node does close the first connection (decision 306), the source node sends a close message to the destination node (not shown). The system sets, by the destination node, an expected incoming PSN associated with the destination node to a greater of a current value of the expected incoming PSN and the starting PSN associated with the source node incremented by one (operation 308). For example, in FIG. 2A, node A may send a close request message to node B (211), and upon receiving the close request message, node B can set its B.eiPSN to greater of its B.eiPSN and the A.startPSN incremented by one: B.eiPSN=MAX (B.eiPSN, A.startPSN+1)=1 (212). The value of the A.startPSN used in this maximum operation is the value used to open the connection and not the current value of A.startPSN (although the same term "A.startPSN" is used in 211 and 212). That is, the startPSN used in the maximum operation by the destination node upon receiving a request to close a connection is the startPSN used to open that connection and is not the current value of the startPSN of the source node.

The system sends, by the destination node to the source node, a close response message which includes the expected incoming PSN (operation 310)) and subsequently allows the source node to set the starting PSN to a greater of a current value of the starting PSN incremented by one and the expected incoming PSN associated with the destination node (operation 312). Continuing with the example in FIG. 2A, node B (destination node) can send a close response message to node A (source node) which includes its expected incoming PSN of B.eiPSN=1 (213). In response, node A (source node) can receive the eiPSN from node B (destination node) and can set its startPSN to a greater of its current startPSN value incremented by one and the eiPSN received from node B: MAX (A.startPSN+1, B.eiPSN)=MAX (0+1, 1)=1 (214 of FIG. 2B). While FIG. 2A, flowchart 300, and the described aspects indicate that the source node (A) can set its starting PSN by selecting the result of this "maximum" operation (i.e., a greater of its current startPSN incremented by one and the eiPSN received from the destination node (B)), the source node (A) may set its starting PSN to any value equal to or greater than the result of the maximum operation. The described maximum operation, including the increment by the value of "1," can be used to aid in minimizing the rate of increase of the PSN in order to perform the rekey operation less frequently.

Figure 4A:
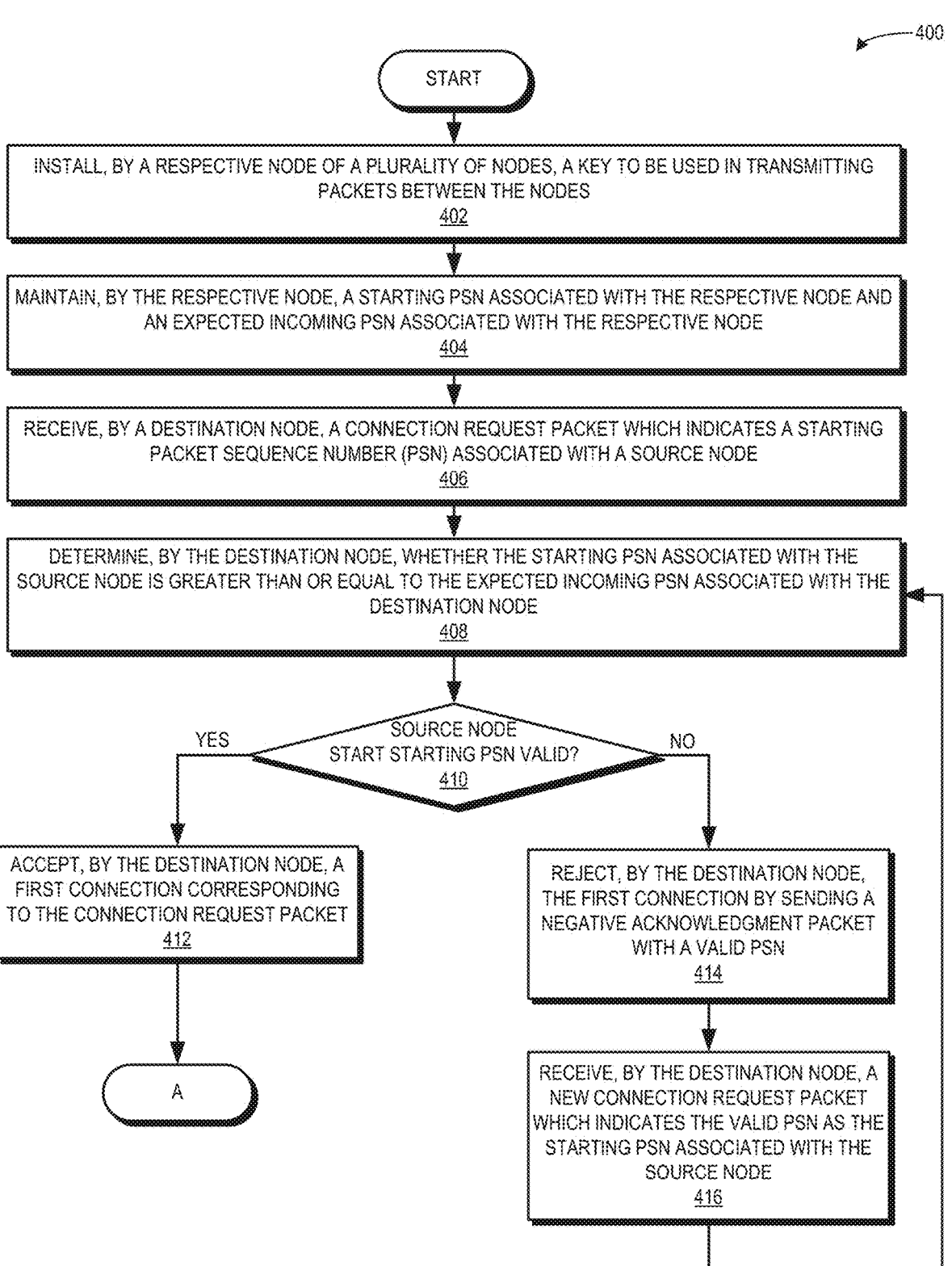
FIG. 4A presents a flowchart illustrating a method which facilitates endpoint state management using start PSNs, including opening a connection and checking for a valid starting PSN, in accordance with an aspect of the present application.

FIG. 4A presents a flowchart 400 illustrating a method which facilitates endpoint state management using start PSNs, including opening a connection and checking for a valid starting PSN, in accordance with an aspect of the present application. During operation, in a system with a plurality of nodes, a respective node installs a key to be used in transmitting packets between the nodes (operation 402). The respective node maintains a starting PSN (startPSN) associated with the respective node and an expected incoming PSN (eiPSN) associated with the respective node (operation 404). Each participating node can maintain two fields (startPSN and eiPSN), which are set to the same values when each node initializes or installs the key. Thus, the startPSN and eiPSN can have the same initial value (e.g., 0) across all nodes for a given key (as depicted by the initial values of fields 281-284 maintained by respective nodes A, B, C, and F in FIGS. 2A-C) and the starting space can be segmented as described above for operation 302.

The system receives, by a destination node, a connection request packet which indicates a starting packet sequence number (PSN) associated with a source node (operation 406, similar to operation 302). For example, node A (source node) opens a connection with node B (destination node), and node B (destination node) receives a connection request packet with the startPSN of A equal to a value of "0" (as described above in relation to communication 201 of FIG. 2A).

The system can determine, by the destination node, whether the starting PSN associated with the source node is greater than or equal to the expected incoming PSN associated with the destination node (operation 408), i.e., whether the starting PSN of the source node is valid. The starting PSN associated with the source node and the expecting incoming PSN associated with the destination node may be equal upon installation of the key and initialization of the pair of fields (startPSN and eiPSN) for each participating node. The starting PSN of the source node may be greater than the expected incoming PSN associated with the destination node if the source node has opened and closed more connections (which may drive up the starting PSN associated with the source node) than the destination node. The reverse may also be true, i.e., the starting PSN of the source node may be less than the expected incoming PSN associated with the destination node if the destination node has opened and closed more connections than the source node.

Figure 4B:
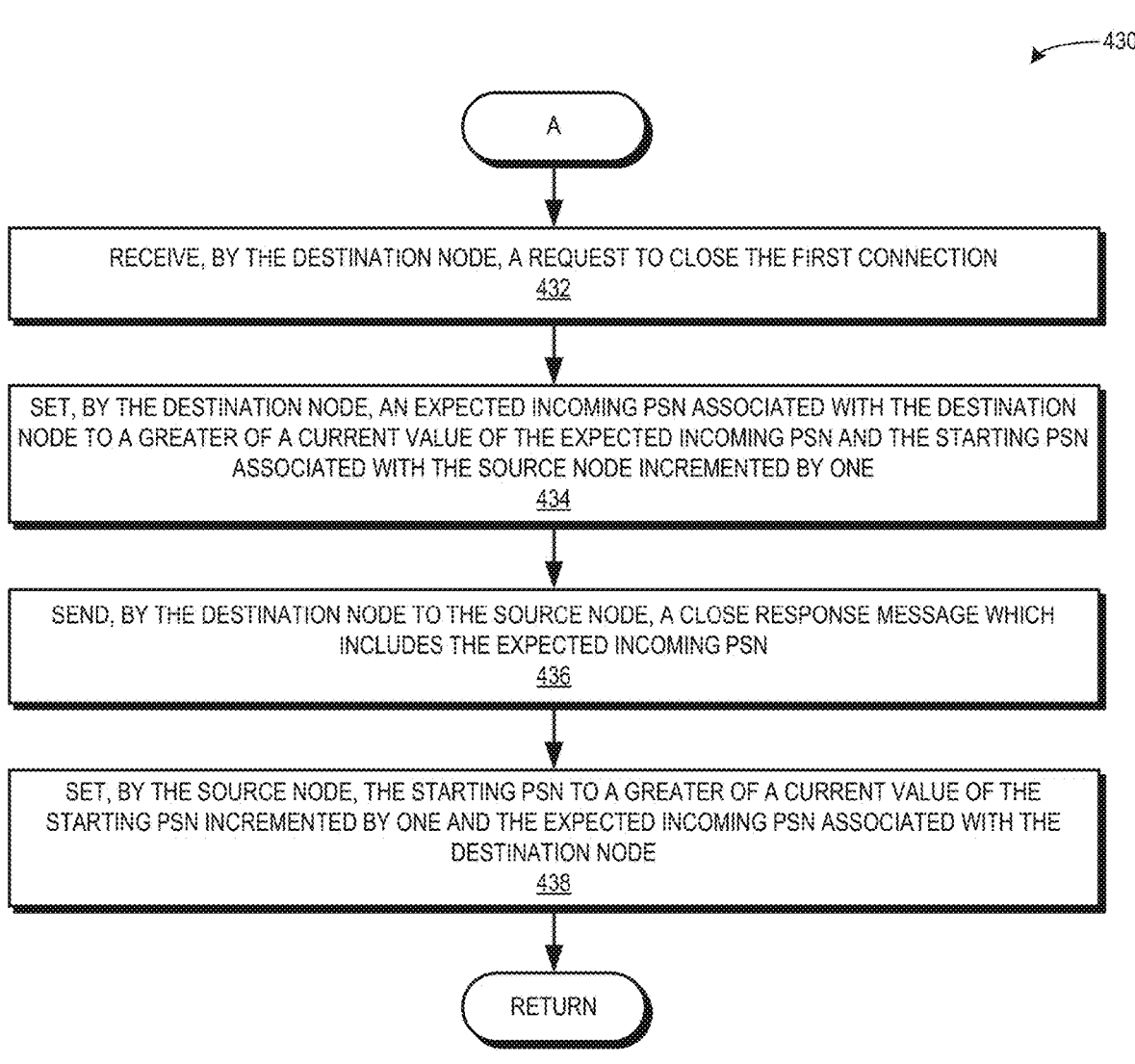
FIG. 4B presents a flowchart illustrating a method which facilitates endpoint state management using start PSNs, including closing a connection, in accordance with an aspect of the present application.

If the starting PSN of the source node is valid (decision 410), the destination node accepts a first connection corresponding to the connection request packet (operation 412), and the operation continues at Label A of FIG. 4B. If the starting PSN of the source node is not valid (decision 410), the destination node rejects the first connection by sending a NACK packet with a valid PSN (operation 414) and the destination node subsequently receives a new connection request packet which indicates the valid PSN as the starting PSN associated with the source node (operation 416). The operation continues as described at operation 408.

For example, in FIG. 2A, node B can receive the connection request packet from node A (201) and perform a check (202) to determine whether A.startPSN>=B.eiPSN. Since this is true (because 0>=0), node B can accept the connection (203). However, in the event that the starting PSN of the source node is not valid, as described above in relation operations 241 and 243 of FIG. 2B, the destination node F can send a NACK with its current eiPSN of 2 and subsequently receive from the source node A a new connection request which includes the startPSN of "2" (244). Node B can then perform a check (245) to determine whether A.startPSN>=B.eiPSN. Since this is true (because 2>=2), node B can accept the connection (246 and as in operation 416). The operation continues at Label A of FIG. 4B. In some aspects, instead of sending the NACK with its current eiPSN, the destination node can send a largest starting PSN across all open connections on the destination node, as described above in relation to operations 277/278 of FIG. 2C.

FIG. 4B presents a flowchart 430 illustrating a method which facilitates endpoint state management using start PSNs, including closing a connection, in accordance with an aspect of the present application. Subsequent to the operations of flowchart 400, the source node can determine to close the first connection and send a close message to the destination node (not shown in FIG. 4B). The destination node receives the request to close the first connection (operation 432) and sets an expected incoming PSN associated with the destination node to a greater of a current value of the expected incoming PSN and the starting PSN associated with the source node incremented by one (operation 434, similar to operation 308). For example, in FIG. 2A, node A may send a close request message to node B (211), and upon receiving the close request message, node B can set its B.eiPSN to greater of its B.eiPSN and the A.startPSN incremented by one: B.eiPSN=MAX (B.eiPSN, A.startPSN+1)=1 (212). Alternatively, upon receiving the close request message, the destination node can determine that a largest starting PSN across all open connections on the destination node is greater than the expected incoming PSN associated with the destination node and can set, based on a condition or heuristic, its expected incoming PSN to the largest starting PSN incremented by one. For example, in FIG. 2C, node F (destination node) can determine that the largest PSN it has seen ("45") is greater than its F.eiPSN ("15") and can set, based on a condition or heuristic, its F.eiPSN to the largest PSN incremented by one (45+1=46) (277 and 278).

The destination node sends to the source node a close response message which includes the expected incoming PSN (operation 436, similar to operation 310). For example, in FIG. 2A, node B (destination node) can send a close response message to node A (source node) which includes its expected incoming PSN of B.eiPSN=1 (213 of FIG. 2A). In another example, node F (destination node) can send a close response message to node C (source node) which includes its expected incoming PSN of F.eiPSN=46 (278 of FIG. 2C). Subsequently, the system allows the source node to set the starting PSN to a greater of a current value of the starting PSN incremented by one and the expected incoming PSN associated with the destination node (operation 438, similar to operation 312). Continuing with the example in FIG. 2A, node A (source node) can receive the eiPSN from node B (destination node) and can set its startPSN to a greater of its current startPSN value incremented by one and the eiPSN received from node B: MAX (A.startPSN+1, B.eiPSN)=MAX (0+1, 1)=1 (214). In the example of FIG. 2C, node C (source node) can receive the eiPSN from node F (destination node) (278) and can set its startPSN to a greater of its current startPSN value incremented by one and the eiPSN received from node F: MAX (C.startPSN+1, F.eiPSN)=MAX (10+1, 46)=46 (280). The operation returns.

FIG. 5 illustrates a computer system 500 which facilitates endpoint state management using start PSNs, in accordance with an aspect of the present application. Computer system 500 includes a processor 502, a memory 504, and a storage device 506. Memory 504 can include a volatile memory (e.g., random access memory (RAM)) that serves as a managed memory and can be used to store one or more memory pools. Furthermore, computer system 500 can be coupled to peripheral I/O user devices 510 (e.g., a display device 511, a keyboard 512, and a pointing device 513). Storage device 506 includes non-transitory computer-readable storage medium and stores an operating system 516, a content-processing system 518, and data 532. Computer system 500 may include fewer or more entities or instructions than those shown in FIG. 5.

Content-processing system 518 can include instructions, which when executed by computer system 500, can cause computer system 500 to perform methods and/or processes described in this disclosure. Specifically, content-processing system 518 may include instructions 520 to receive, by computer system 500 operating as a destination node in a plurality of nodes, a connection request packet which indicates a starting packet sequence number (PSN) associated with a source node, as described above in relation to, e.g.:

communications 201, 206, and 215 of FIG. 2A; communications 240 and 244 of FIG. 2B; and communication 270 of FIG. 2C. Content-processing system 518 may include instructions 522 to determine whether the starting PSN is valid, as described above in relation to, e.g.: operations 202, 207, and 216 of FIG. 2A; operations 241 and 245 of FIG. 2B; and operation 271 of FIG. 2C. Content-processing system 518 may include instructions 524 to accept a connection corresponding to the connection request packet in response to the starting PSN being valid, as described above in relation to, e.g.: communications 203, 208, and 217 of FIG. 2A; communication 246 of FIG. 2B; and communication 272 of FIG. 2C.

Content-processing system 518 may include instructions 526 to receive a request to close the first connection, as described above in relation to, e.g.: communications 211 and 219 of FIG. 2A; communications 250 and 254 of FIG. 2B; and communication 277 of FIG. 2C. Content-processing system 518 may include instructions 528 to set an expected incoming PSN associated with the destination node to a greater of a current value of the expected incoming PSN and the starting PSN associated with the source node incremented by one, as described above in relation to, e.g.: operations 212 and 220 of FIG. 2A; operations 251 and 255 of FIG. 2B; and operation 279 of FIG. 2C. Content-processing system 528 may include instructions 530 to send, to the source node, a close response message which includes the expected incoming PSN, as described above in relation to, e.g.: communications 213 and 221 of FIG. 2A; communications 252 and 256 of FIG. 2B; and communication 278 of FIG. 2C. Instructions 530 (i.e., sending the close response message) can allow or cause the source node to set the starting PSN to a greater of a current value of the starting PSN incremented by one and the expected incoming PSN associated with the destination node, as described above in relation to, e.g.: operations 214 and 222 of FIG. 2A; operations 253 and 257 of FIG. 2B; and operation 280 of FIG. 2C.

Content-processing system 518 may include more instructions than those shown in FIG. 5. For example, content-processing system 518 can include instructions for executing the operations described above in relation to: the environment of FIG. 1; the communications and operations of FIGS. 2A-C; the operations depicted in the flowcharts of FIGS. 3 and 4A-B; and the instructions of CRM 600 in FIG. 6.

Data 532 can include any data that is required as input or that is generated as output by the methods, operations, communications, and/or processes described in this disclosure. Specifically, data 532 can store at least: a packet; a connection request packet; a connection response message or packet; a close request message or packet; a close response message or packet; an indicator of a first connection; a PSN; an initial value for a PSN; a starting PSN; an expecting incoming PSN; an updated starting PSN; an updated expected incoming PSN; a largest starting PSN; one or more fields maintained by a source node or a destination node; an identifier of a source node or a destination node; an indicator of an accepted or a rejected connection request message or packet; a negative acknowledgment (NACK) packet; a key; an encryption key; a segmented PSN space; a number of different starting PSN values; a result of a hash function; an IP address of a source or a destination node; and an identifier of a connection based on a source node or a destination node.

FIG. 6 illustrates a computer-readable medium 600 which facilitates endpoint state management using start PSNs, in accordance with an aspect of the present application. CRM

600 can be a non-transitory computer-readable medium or device storing instructions that when executed by a computer or processor cause the computer or processor to perform a method. CRM 600 can store instructions 610 to receive a first connection request packet which indicates a starting packet sequence number (PSN) associated with a source node, as described above in relation to, e.g.: communications 201, 206, and 215 of FIG. 2A; communications 240 and 244 of FIG. 2B; and communication 270 of FIG. 2C. CRM 600 can store instructions 612 to accept a first connection corresponding to the first connection request packet in response to the starting PSN being valid, as described above in relation to, e.g.: communications 202/ 203, 207/208, and 216/217 of FIG. 2A; communications 245/246 of FIG. 2B; and communications 271/272 of FIG. 2C.

CRM 600 can further store instructions 614 to determine that the source node requests to close the first connection, as described above in relation to, e.g.: communications 211 and 219 of FIG. 2A; communications 250 and 254 of FIG. 2B; and communication 277 of FIG. 2C. CRM 600 can store instructions 616 to, in response to the source node closing the first connection, set an expected incoming PSN associated with the destination node to greater of a current value of the expected incoming PSN and the starting PSN associated with the source node incremented by one, as described above in relation to, e.g.: operations 212 and 220 of FIG. 2A; operations 251 and 255 of FIG. 2B; and operation 279 of FIG. 2C. CRM 600 can store instructions 618 to send, to the source node, a close response message which includes the expected incoming PSN, as described above in relation to, e.g.: communications 213 and 221 of FIG. 2A; communications 252 and 256 of FIG. 2B; and communication 278 of FIG. 2C. CRM 600 can also store instructions 620 to allow the source node to set the starting PSN to a greater of a current value of the starting PSN incremented by one and the expected incoming PSN associated with the destination node, as described above in relation to, e.g.: operations 214 and 222 of FIG. 2A; operations 253 and 257 of FIG. 2B; and operation 280 of FIG. 2C.

CRM 600 may include more instructions than those shown in FIG. 6. For example, CRM 600 can also store instructions for executing the operations described above in relation to: the environment of FIG. 1; the communications and operations of FIGS. 2A-C; the operations depicted in the flowcharts of FIGS. 3 and 4A-B; and the instructions of content-processing system 518 of computer system 500 in FIG. 5.

In general, the disclosed aspects provide a method, a computer system, and a computer-readable medium which facilitate endpoint state management using start packet sequence numbers (PSNs). During operation, the system receives, by a destination node, a connection request packet which indicates a starting packet sequence number (PSN) associated with a source node. The system accepts, by the destination node, a first connection corresponding to the connection request packet in response to the starting PSN being valid. In response to the source node closing the first connection, the system: sets, by the destination node, an expected incoming PSN associated with the destination node to a greater of a current value of the expected incoming PSN and the starting PSN associated with the source node incremented by one; sends, by the destination node to the source node, a close response message which includes the expected incoming PSN; and allows the source node to set the starting PSN to a greater of a current value of the starting PSN incremented by one and the expected incoming PSN associated with the destination node.

In a variation on this aspect, the expected incoming PSN associated with the destination node corresponds to an expected starting PSN associated with the source node.

In a further variation, the system determines, by the destination node, whether the starting PSN associated with the source node is valid by comparing the starting PSN associated with the source node and the expected incoming PSN associated with the destination node. The system accepts the first connection in response to the starting PSN associated with the source node being greater than or equal to the expected incoming PSN associated with the destination node.

In a further variation, in response to the starting PSN associated with the source node being less than the expected incoming PSN associated with the destination node, the system rejects the first connection by sending, by the destination node, a negative acknowledgment packet with a valid PSN to the source node.

In a further variation, the system receives, by the destination node, a new connection request packet which indicates the valid PSN as the starting PSN associated with the source node.

In another variation, the valid PSN comprises at least one of: a current value of the expected incoming PSN associated with the destination node; or a largest starting PSN across all open connections on the destination node incremented by one.

In another variation, a starting PSN for a respective connection between a pair of nodes is unique for the key and is not reused for a subsequent connection between the pair of nodes for the key.

In another variation, the system maintains, by a respective node of a plurality of nodes, a starting PSN associated with the respective node and an expected incoming PSN associated with the respective node. The starting PSN and the expected incoming PSN comprise a same initial value across all the nodes which have installed an encryption key.

In another variation, in response to the source node closing the first connection, the system performs the following operations. The system determines that a largest starting PSN across all open connections on the destination node is greater than the expected incoming PSN associated with the destination node. The system sets, based on a condition, the expected incoming PSN associated with the destination node to the largest starting PSN incremented by one. The system sends, by the destination node to the source node, the close response message which includes the previously set expected incoming PSN associated with the destination node.

In another variation, the system segments, for an encryption key, a total space of PSN values into a number of starting PSN spaces. The system determines the current value of the expected incoming PSN associated with the destination node based on a first hash performed on one or more fields associated with the source node, wherein a result of the first hash corresponds to a first starting PSN space.

In a further variation, the starting PSN associated with the source node indicated in the connection request packet is obtained from a second hash performed on one or more fields associated with the destination node, and a result of the second hash corresponds to a second starting PSN space.

In a further variation, the one or more fields associated with the destination node comprise at least one of an internet protocol (IP) address of the source node and an identifier of the first connection based on the source node, and the one or more fields associated with the source node comprise at least one of an IP address of the destination node and an identifier of the first connection based on the destination node.

In another aspect, a computer system comprises a processor and a storage device storing instructions. The instructions are to receive, by the computer system operating as a destination node in a plurality of nodes, a connection request packet which indicates a starting packet sequence number (PSN) associated with a source node. The instructions are further to accept a first connection corresponding to the connection request packet in response to the starting PSN being valid. The instructions are further to receive a request to close the first connection and set an expected incoming PSN associated with the destination node to a greater of a current value of the expected incoming PSN and the starting PSN associated with the source node incremented by one. The instructions are further to send, to the source node, a close response message which includes the expected incoming PSN, wherein sending the close response message causes the source node to set the starting PSN to a greater of a current value of the starting PSN incremented by one and the expected incoming PSN associated with the destination node. The computer system may include a content-processing system which includes instructions to perform the operations described herein, including in relation to: the environment of FIG. 1; the communications and operations of FIGS. 2A-C; the operations depicted in the flowcharts of FIGS. 3 and 4A-B; and the instructions of CRM 600 in FIG. 6

In another aspect, a non-transitory computer-readable storage medium (or CRM) stores instructions to receive, by a destination node, a first connection request packet which indicates a starting packet sequence number (PSN) associated with a source node. The instructions are further to accept, by the destination node, a first connection corresponding to the first connection request packet in response to the starting PSN being valid. The instructions are further to, in response to the source node closing the first connection: set, by the destination node, an expected incoming PSN associated with the destination node to a greater of a current value of the expected incoming PSN and the starting PSN associated with the source node incremented by one; send, by the destination node to the source node, a close response message which includes the expected incoming PSN; and allow the source node to set the starting PSN to a greater of a current value of the starting PSN incremented by one and the expected incoming PSN associated with the destination node. The CRM can also store instructions for executing the operations described above in relation to: the environment of FIG. 1; the communications and operations of FIGS. 2A-C; the operations depicted in the flowcharts of FIGS. 3 and 4A-B; and the instructions of content-processing system 518 of computer system 500 in FIG. 5.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:
receiving, by a destination node, a connection request packet which indicates a starting packet sequence number (PSN) associated with a source node;
determining that the starting PSN is valid;
accepting, by the destination node, a first connection corresponding to the connection request packet in response to the starting PSN being valid;
receiving a request from the source node to close the first connection; and
in response to receiving the request from the source node to close the first connection:
setting, by the destination node, an expected incoming PSN associated with the destination node to a greater of a current value of the expected incoming PSN and the starting PSN associated with the source node incremented by one;
sending, by the destination node to the source node, a close response message which includes the expected incoming PSN; and
allowing the source node to set the starting PSN to a greater of a current value of the starting PSN incremented by one and the expected incoming PSN associated with the destination node.

2. The method of claim 1, wherein the expected incoming PSN associated with the destination node corresponds to an expected starting PSN associated with the source node.

3. The method of claim 1, further comprising:
determining, by the destination node, whether the starting PSN associated with the source node is valid by comparing the starting PSN associated with the source node and the expected incoming PSN associated with the destination node; and
accepting the first connection in response to the starting PSN associated with the source node being greater than or equal to the expected incoming PSN associated with the destination node.

4. The method of claim 3, further comprising:
in response to the starting PSN associated with the source node being less than the expected incoming PSN associated with the destination node, rejecting the first connection by sending, by the destination node, a negative acknowledgment packet with a valid PSN to the source node.

5. The method of claim 4, further comprising:
receiving, by the destination node, a new connection request packet which indicates the valid PSN as the starting PSN associated with the source node.

6. The method of claim 4, wherein the valid PSN comprises at least one of:
a current value of the expected incoming PSN associated with the destination node; or
a largest starting PSN across all open connections on the destination node incremented by one.

7. The method of claim 1, wherein a starting PSN for a respective connection between a pair of nodes is unique for the key and is not reused for a subsequent connection between the pair of nodes for the key.

8. The method of claim 1, further comprising:
maintaining, by a respective node of a plurality of nodes, a starting PSN associated with the respective node and an expected incoming PSN associated with the respective node,
wherein the starting PSN and the expected incoming PSN comprise a same initial value across all the nodes which have installed an encryption key.

9. The method of claim 1, wherein in response to receiving the request from the source node to close the first connection, the method further comprises:
determining that a largest starting PSN across all open connections on the destination node is greater than the expected incoming PSN associated with the destination node;
setting, based on a condition, the expected incoming PSN associated with the destination node to the largest starting PSN incremented by one; and
sending, by the destination node to the source node, the close response message which includes the previously set expected incoming PSN associated with the destination node.

10. The method of claim 1, further comprising:
segmenting, for an encryption key, a total space of PSN values into a number of starting PSN spaces; and
determining the current value of the expected incoming PSN associated with the destination node based on a first hash performed on one or more fields associated with the source node, wherein a result of the first hash corresponds to a first starting PSN space.

11. The method of claim 10, wherein the starting PSN associated with the source node indicated in the connection request packet is obtained from a second hash performed on one or more fields associated with the destination node, and wherein a result of the second hash corresponds to a second starting PSN space.

12. The method of claim 11: wherein the one or more fields associated with the destination node comprise at least one of an internet protocol (IP) address of the source node and an identifier of the first connection based on the source node; and
wherein the one or more fields associated with the source node comprise at least one of an IP address of the destination node and an identifier of the first connection based on the destination node.

13. A computer system, comprising:
a processor; and
a storage device storing instructions to:
receive, by the computer system operating as a destination node in a plurality of nodes, a connection request packet which indicates a starting packet sequence number (PSN) associated with a source node;
accept a first connection corresponding to the connection request packet in response to the starting PSN being valid;
receive a request to close the first connection;
set an expected incoming PSN associated with the destination node to a greater of a current value of the expected incoming PSN and the starting PSN associated with the source node incremented by one; and
send, to the source node, a close response message which includes the expected incoming PSN,
wherein sending the close response message causes the source node to set the starting PSN to a greater of a current value of the starting PSN incremented by one and the expected incoming PSN associated with the destination node.

14. The computer system of claim 13, the instructions further to:

determine whether the starting PSN associated with the source node is valid by comparing the starting PSN associated with the source node and the expected incoming PSN associated with the destination node; and accept the first connection in response to the starting PSN associated with the source node being greater than or equal to the expected incoming PSN associated with the destination node.

15. The computer system of claim 13, the instructions further to:

determine that the starting PSN associated with the source node being less than the expected incoming PSN associated with the destination node;

reject the first connection by sending a negative acknowledgment packet with a valid PSN to the source node in response to the determination that the starting PSN associated with the source node is less than the expected incoming PSN associated with the destination node; and receive a new connection request packet which indicates the valid PSN as the starting PSN associated with the source node.

16. The computer system of claim 14, wherein the valid PSN comprises at least one of:

a current value of the expected incoming PSN associated with the destination node; or a largest starting PSN across all open connections on the destination node incremented by one.

17. The computer system of claim 13, wherein a starting PSN for a respective connection between a pair of nodes is unique for the key and is not reused for a subsequent connection between the pair of nodes for the key, and wherein the instructions are further to maintain, by a respective node, a starting PSN associated with the respective node and an expected incoming PSN associated with the respective node, wherein the starting PSN and the expected incoming PSN comprise a same initial value across all the nodes which have installed an encryption key.

18. The computer system of claim 13, the instructions further to:

determine that a largest starting PSN across all open connections on the destination node is greater than the expected incoming PSN associated with the destination node;

determine, based on one or more conditions, whether to send, as the expected incoming PSN included in the close response message, the largest starting PSN incremented by one; and include, in the close response message to the source node, the largest starting PSN incremented by one as the expected incoming PSN.

19. A non-transitory computer-readable medium storing instructions to:

receive, by a destination node, a first connection request packet which indicates a starting packet sequence number (PSN) associated with a source node;

accept, by the destination node, a first connection corresponding to the first connection request packet in response to the starting PSN being valid; and in response to the source node closing the first connection:

set, by the destination node, an expected incoming PSN associated with the destination node to a greater of a current value of the expected incoming PSN and the starting PSN associated with the source node incremented by one;

send, by the destination node to the source node, a close response message which includes the expected incoming PSN; and allow the source node to set the starting PSN to a greater of a current value of the starting PSN incremented by one and the expected incoming PSN associated with the destination node.

20. The non-transitory computer-readable medium of claim 19, the instructions further to:

accept the first connection in response to the starting PSN associated with the source node being greater than or equal to the expected incoming PSN associated with the destination node; and reject the first connection by sending, by the destination node, a negative acknowledgment packet with a valid PSN to the source node in response to the starting PSN associated with the source node being less than the expected incoming PSN associated with the destination node, wherein in response to the source node closing the first connection, the instructions are further to:

send, by the destination node to the source node, the close response message which includes a largest starting PSN across all open connections on the destination node incremented by one, wherein the expected incoming PSN associated with the destination node comprises the largest starting PSN incremented by one; and allow the source node to set the starting PSN associated with the source node to the largest starting PSN incremented by one included in the close response message sent to the source node.

* * * * *